United States Patent
Silveira

(10) Patent No.: US 11,451,980 B2
(45) Date of Patent: Sep. 20, 2022

(54) COMMUNICATION TO UNDER-SERVED AREAS USING COMMUNICATION ENABLED VEHICLES

(71) Applicant: T-Mobile USA, Inc., Bellevue, WA (US)

(72) Inventor: Anthony Silveira, Downers Grove, IL (US)

(73) Assignee: T-MOBILE USA, INC., Bellevue, WA (US)

( * ) Notice: Subject to any disclaimer, the term of this patent is extended or adjusted under 35 U.S.C. 154(b) by 174 days.

(21) Appl. No.: 16/910,932

(22) Filed: Jun. 24, 2020

(65) Prior Publication Data
US 2021/0409971 A1    Dec. 30, 2021

(51) Int. Cl.
| H04W 24/02 | (2009.01) |
| H04B 7/185 | (2006.01) |
| H04W 92/04 | (2009.01) |
| H04W 88/08 | (2009.01) |
| H04W 84/10 | (2009.01) |

(52) U.S. Cl.
CPC ........ *H04W 24/02* (2013.01); *H04B 7/18504* (2013.01); *H04B 7/1851* (2013.01); *H04W 84/10* (2013.01); *H04W 88/08* (2013.01); *H04W 92/04* (2013.01)

(58) Field of Classification Search
None
See application file for complete search history.

(56) References Cited

U.S. PATENT DOCUMENTS

| 9,363,008 | B2* | 6/2016 | Boss ...................... H04M 15/68 |
| 9,635,706 | B1* | 4/2017 | Bonawitz .............. H04W 84/18 |
| 9,973,261 | B1* | 5/2018 | Hardy ..................... G05D 1/104 |
| 10,034,209 | B1* | 7/2018 | Nandan ............. H04B 7/18504 |
| 11,024,957 | B1* | 6/2021 | Ananth ................ H01Q 3/2611 |
| 2016/0363929 | A1* | 12/2016 | Clark .................... B64C 39/024 |
| 2017/0142595 | A1* | 5/2017 | Ljung ................ H04B 7/18504 |
| 2020/0307830 | A1* | 10/2020 | Fischer ..................... B64F 3/02 |
| 2021/0200204 | A1* | 7/2021 | Candido ................ G08G 5/003 |
| 2021/0313669 | A1* | 10/2021 | Ananth .................. H01Q 1/185 |

* cited by examiner

Primary Examiner — Ajit Patel
(74) Attorney, Agent, or Firm — Loeb & Loeb LLP

(57) ABSTRACT

A mobile receiving vehicle may be directed to cover an area to maximize the communication opportunities for mobile computing devices. The demands on the mobile receiving vehicles may change over time and the mobile receiving vehicles may move according to a plan to maximize network access.

11 Claims, 5 Drawing Sheets

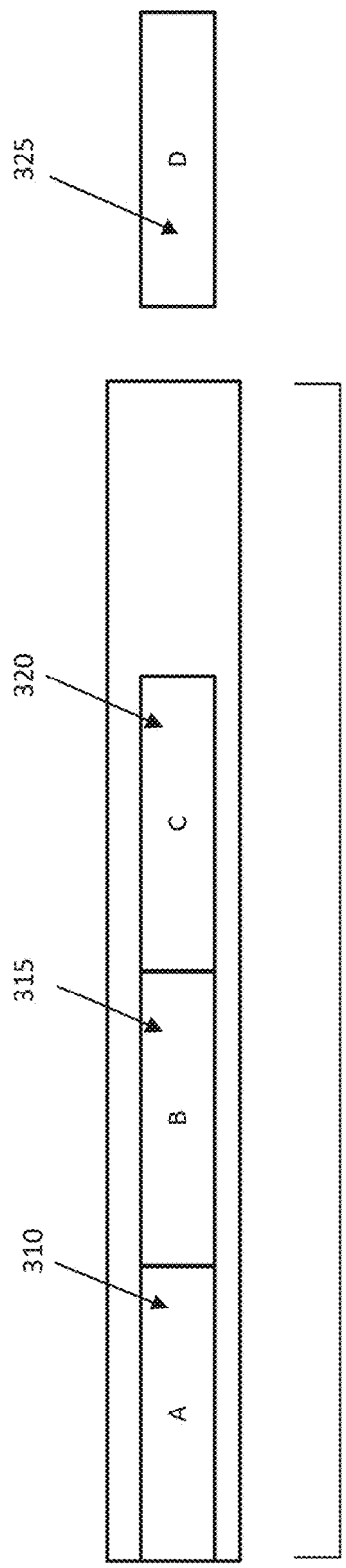
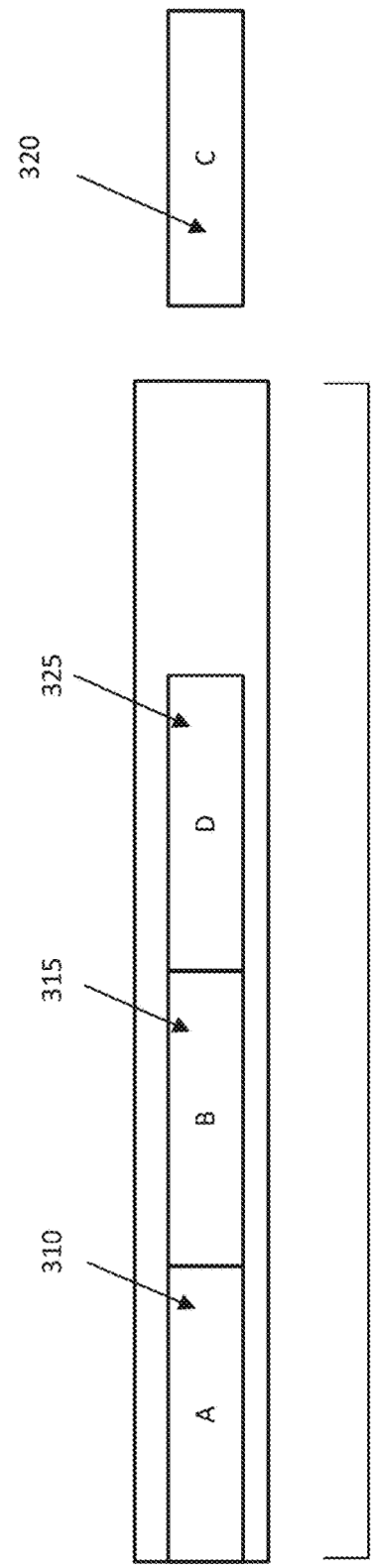

COMMUNICATION TO UNDER-SERVED AREAS USING COMMUNICATION ENABLED VEHICLES

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Providing network service to remote locations or hard to reach locations has long been a problem. Stringing wires across remote lands to provide service to a minimal number of users may not make economic sense. Similarly, there may be times when a venue has a temporary surge in usage and may need additional network access for a limited period of time. Again, permanently wiring antennas may not make sense when the access requests may be high.

Portable network access has been attempted with limited success. Large network access vehicles may be available but these vehicles may be limited to roads or easily reached locations, Smaller network access vehicles may be more nimble but they often require battery power and can only cover a limited range.

SUMMARY

The described system and method may use a primary mobile receiving vehicle in high speed communication with a communication agent. The communication agent may be less mobile and the primary receiving device may be more mobile, such as a drone. The primary mobile receiving vehicle may include a primary mobility enablement device which may assist in moving the vehicle. The primary receiving agent may also have a high speed communication link to the communication agent such as a wired link. The primary receiving agent may also have a power link to a power supply which may be a wired link. The primary receiving agent may also have a secure primary mobile communication device to communicate with one or more mobile receiving vehicles which may be even more mobile and may not have a wired connection.

The plurality of mobile receiving vehicles may be in communication with the primary mobile receiving vehicle. The mobile receiving vehicles may include a mobility enablement device such as a motor to spin a wheel or a propeller. The mobile receiving vehicles may include a secure communication device to wirelessly communicate with the primary receiving device. The mobile receiving device may also include a portable power source such as a battery or a fuel cell.

In operation, the mobile receiving vehicle may be directed to cover an area to maximize the communication opportunities for mobile computing devices. The demands on the mobile receiving vehicles may change over time and the mobile receiving vehicles may move according to a plan to maximize network access. As the mobile receiving devices may be powered by batteries, the system may control how the mobile receiving devices are rotated in and out of service to keep the mobile receiving devices from running out of power.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein, FIG. 1 may be an illustration of an implementation of the equipment in the mobile network;

FIG. 4A may be an illustration of blocks of data rotated to train a machine learning system;

FIG. 4B may be an illustration of blocks of data rotated to train a machine learning system.

SPECIFICATION

Figure 1:
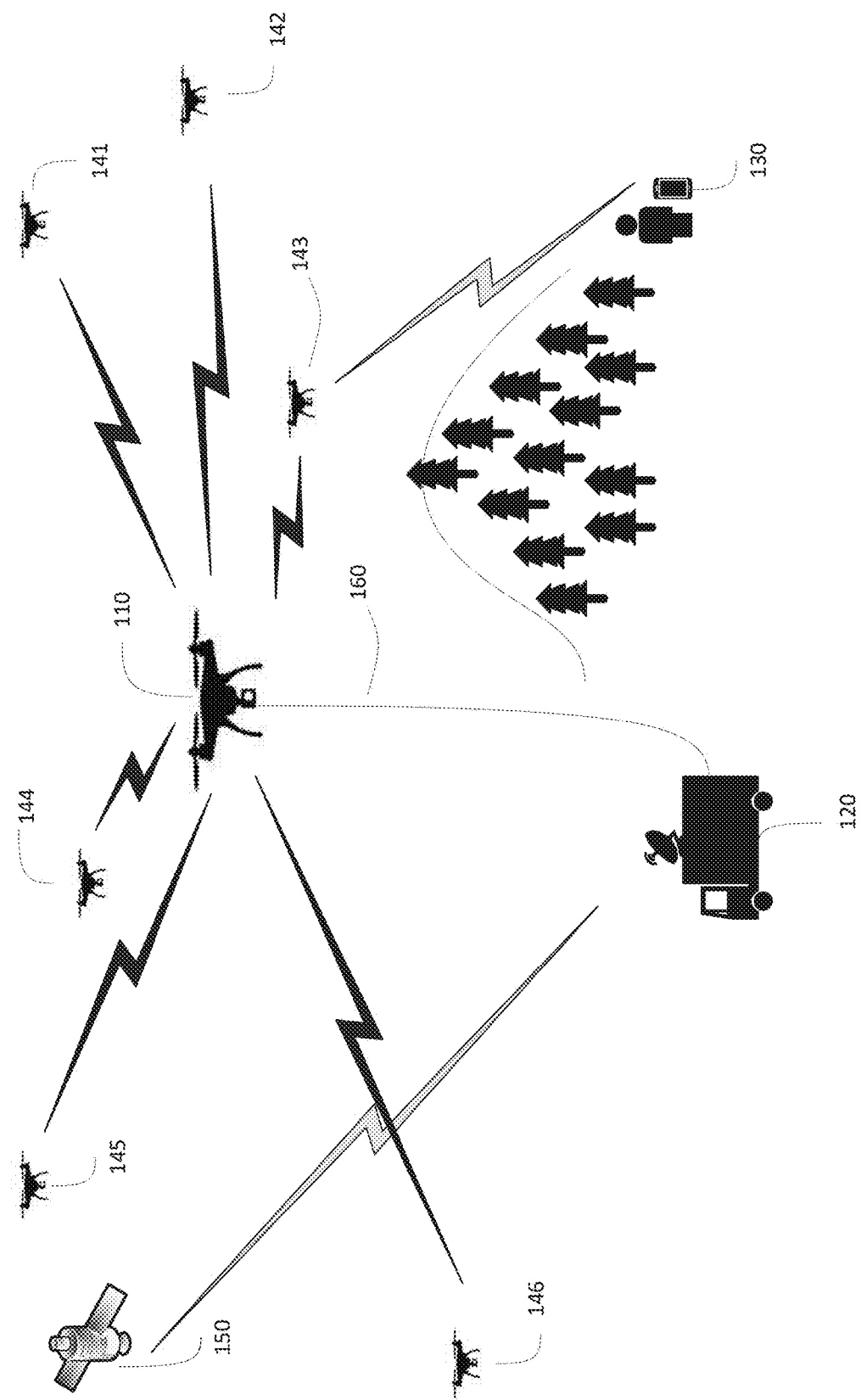

Referring now to FIG. 1, providing network service to remote locations or hard to reach locations has long been a problem, Stringing wires across remote lands to provide service to a minimal number of users may not make economic sense. Similarly, there may be times when a venue has a temporary surge in usage and may need additional network access for a limited period of time. Again, permanently wiring antennas may not make sense when the access requests may be high.

Portable network access has been attempted with limited success. Large network access vehicles may be available but these vehicles may be limited to roads or easily reached locations. Smaller network access vehicles may be more nimble but they often require battery power and can only cover a limited range.

The described system and method may use a primary mobile receiving vehicle in high speed communication with a communication agent. The communication agent may be less mobile and the primary receiving device may be more mobile, such as a drone. The primary mobile receiving vehicle may include a primary mobility enablement device which may assist in moving the vehicle. The primary receiving agent may also have a high speed communication link to the communication agent such as a wired link. The primary receiving agent may also have a power link to a power supply which may be a wired link. The primary receiving agent may also have a secure primary mobile communication device to communicate with one or more mobile receiving vehicles which may be even more mobile and may not have a wired connection.

The plurality of mobile receiving vehicles may be in communication with the primary mobile receiving vehicle. The mobile receiving vehicles may include a mobility enablement device such as a motor to spin a wheel or a propeller. The mobile receiving vehicles may include a secure communication device to wirelessly communicate with the primary receiving device. The mobile receiving device may also include a portable power source such as a battery or a fuel cell.

In operation, the mobile receiving vehicle may be directed to cover an area to maximize the communication opportunities for mobile computing devices. The demands on the mobile receiving vehicles may change over time and the mobile receiving vehicles may move according to a plan to maximize network access. As the mobile receiving devices may be powered by batteries, the system may control how the mobile receiving devices are rotated in and out of service to keep the mobile receiving devices from running out of power.

By using many mobile receiving vehicles 141-146, the technical problem of providing network access may be addressed. In addition, the mobile receiving vehicles 141-146 may communicate data regarding the number of requests for network access and the strength of the signal to mobile computing devices 130 and the communication agent 120 which may be analyzed to provide an improved coverage pattern.

Figure 2:
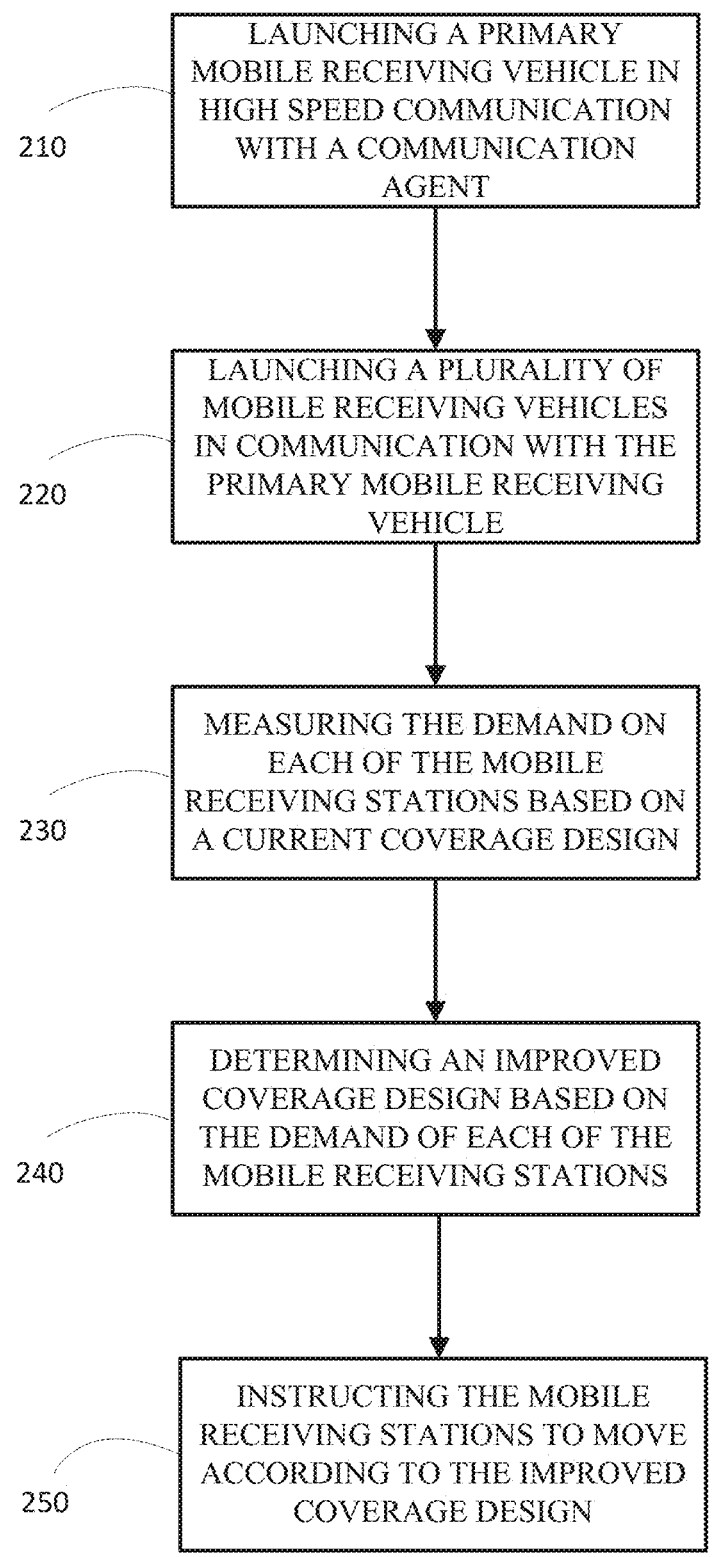
FIG. 2 may be a flowchart of computer executable blocks undertaken by the network.

FIG. 2 may illustrate a method of providing a cellular communication network over an area. At block 210, a primary mobile receiving vehicle 110 (FIG. 1) in high speed communication with a communication agent 120 may be launched. In some embodiments, the primary mobile receiving vehicle 110 may be a vehicle capable of flying such as a drone, a small unmanned flying plane or a small helicopter. In other embodiments, the vehicle may be able to follow challenging terrain to reach hard to reach places. In even other embodiments, the primary mobile receiving vehicle may be able to traverse in or over water such as a boat.

The high speed communication may be accomplished the a physical link or umbilical 160 to the communication agent. The physical link 160 may carry power to the primary mobile receiving vehicle 110 which may allow the primary mobile receiving vehicle 110 to stay aloft or travel with minimal regard to power usage in contrast to vehicles that rely on portable power sources such as batteries or capacitors or engines that use fuel. In addition, the physical link may carry data to and from the communication agent 120 at extremely high speed by using fiber or other high speed mediums. The physical link 160 may also be less prone to interference, may be less prone to being hacked and may have lower error rates than wireless links.

The physical link may be one or more cables. As mentioned previously, one cable may carry data and may be light weight such as fiber. Another cable may provide power to the primary mobile receiving vehicle 110 such as through a low resistance core such as copper. In some embodiments, the primary mobile receiving vehicle 110 may require fuel or cooling fluid and the fuel or fluid may be carried to and from the primary mobile receiving vehicle 100 through hoses. The cables and or hoses may be wrapped in a protective cover in case of electrical lines, fire risk, water, snow, dragging, etc. Additional cables and hoses may be included as back ups in case the main cables are broken.

The primary mobile receiving vehicle 110 may include a primary mobility enablement device. In some cases, the primary mobility enablement device may be a motor. In the case where the primary mobile receiving vehicle 110 is a drone, the motor may drive one of more rotors (directly or through a transmission) which may give loft to the primary mobile receiving vehicle. The motor may be light weight so it may travel easily, highly efficient so it is efficient with its power, temperature tolerant so it may move through many environments and may be able to run for virtually an infinite time. Electric motors may be adapted to the pmed task and small fuel based motors may also be adapted to be the primary mobility enablement device.

The primary mobile receiving vehicle 110 may also include a secure primary mobile communication device. The primary mobile communication device may be similar to a mobile cellular tower with the capacity to communicate with a large number of different mobile units as virtually the same time in virtually all directions. In some embodiments, the base station type equipment is in the primary mobile receiving vehicle 110 and in other embodiments, the base station equipment is in the communication agent 120.

The primary mobile receiving vehicle 110 may also have a high speed communication link 160 to the communication agent 120. As mentioned previously, in some embodiments the base station equipment is in the communication agent 120 and is connected to the primary mobile receiving vehicle 110 through the umbilical 160 while in other embodiments, the base station equipment is in the primary mobile receiving vehicle 110. In either case, large amounts of data may flow into and through the primary mobile receiving vehicle 110 meaning the communication link 160 may be very high speed and high volumes and able to withstand significant temperatures and vibrations.

The primary mobile receiving vehicle 110 also may have a power link to a power supply. The various equipment in the primary mobile receiving vehicle may require electricity and by feeding the electricity through the umbilical, concerns regarding battery weight and capacity may be minimized. Thus, the primary mobile receiving vehicle may stay in motion for virtually an unlimited amount of time.

The communication agent 120 may be a vehicle that provides support to the primary mobile receiving vehicle and is a link to the wider Internet. In one example, the communication agent 120 may be a truck type vehicle that has additional electrical support to supply to primary mobile receiving vehicle 110 with electricity either from a generator or from other electrical equipment that is part of the communication agent 120. The communication agent 120 also may have an additional antenna to obtain data in remote places at high speed such as through an antenna that communicates with a source that is in high speed communication with the Internet such as a remote cellular tower or satellites 145. The communication agent 120 may have communication hardware to receive the data from the satellite 145, format it for communication to the primary mobile receiving vehicle 110 and communicate it to the primary mobile receiving vehicle 110.

Referring again to FIG. 2, at block 220 a plurality of mobile receiving vehicles 141-146 in communication with the primary mobile receiving vehicle may be launched. The mobile receiving vehicles may be additional vehicles that are in communication with the primary mobile receiving vehicle 110 and with user with portable communication device 130 such as a smart phone. The mobile receiving vehicles may be used to form a network with the primary mobile receiving vehicle 110 to extend the reach of the primary mobile receiving vehicle network.

The mobile receiving device 141-146 may take on a variety of forms. In one embodiment, the mobile receiving vehicle 141-146 may be drones. In another embodiment, the mobile receiving vehicle 141-146 may be on ground vehicles. Logically, a combination of land and air mobile receiving vehicle 141-146 may be used. The mobile receiving device 141-146 may enable the network to cover a larger area and reach more places that just a single primary mobile receiving vehicle 110.

The mobile receiving vehicle 141-146 may have a mobility enablement device such as a motor. The motor may be adapted to the particular mobile receiving vehicle device 141-146. If the mobile receiving vehicle device is a drone, it may be helpful if the motor is light and conserves electricity. If the mobile receiving vehicle device is land based, it may move to a location and stop meaning that energy savings is not as critical as a vehicle that needs to maintain loft.

The mobile receiving vehicle 141-146 may also have a secure communication device such as a modem or wifi hot spot type device. The communication device may communication with eth primary mobile receiving vehicle 110 and with portable computing devices 130 to enable the portable computing devices 130 to have network access in remote locations. In some embodiments, the communication device may be modified to prioritize long distance communication and data rates may be of a lesser concern. In other embodiments, the communication device may be modified to provide high data rates over a smaller distance.

The mobile receiving vehicle 141-146 may also have one or more portable power source such as a battery, a capacitor, a fuel cell or a fuel tank. Logically, the portable power source may be related to the type of mobility enablement device. For example, an electric motor may need an electrical source and a fuel based motor may need fuel.

At block 230, the demand on each of the mobile receiving stations may be measured based on a current coverage design. The strength of a signal received from the primary mobile receiving vehicle 110 may be measured at the mobile receiving vehicle 141-146 and the strength of the signal received from the portable computing device 130 may be measured at each mobile receiving vehicle 141-146. As the mobile receiving vehicles 141-146 may be mobile, the mobile receiving vehicles 141-146 may be moved to both stay in communication with the primary mobile receiving vehicle 110 and provide an even stronger signal to the portable computing devices 130. In addition, one area may have many portable computing device 130 and may require more mobile receiving vehicles 141-146 to provide adequate coverage while other areas may have fewer portable computing devices 130 and may require fewer mobile receiving vehicles 141-146.

At block 240, an improved coverage design may be determined based on the demand of each of the mobile receiving stations. An algorithm may be present in the primary mobile receiving vehicle 110 or communication agent 120 that takes into account the signal strength at the portable computing devices 130 at the mobile receiving vehicles 141-146 and the signal strength at the primary mobile receiving vehicle 110 to develop a coverage design that provides an optimal service to an area. For example, one area may have many portable computing device 130 and may require more mobile receiving vehicles 141-146 to provide adequate coverage while other areas may have fewer portable computing devices 130 and may require fewer mobile receiving vehicles 141-146.

In some embodiments, the primary mobile receiving vehicle 110 may have the ability to study the terrain being covered by the network and may predict the location where the mobile receiving vehicles 141-146 will provide the optimal coverage. Past experience may be used to help predict the locations. For example, machine learning may be used to analyze past situations to predict an improved coverage pattern.

Figure 3:
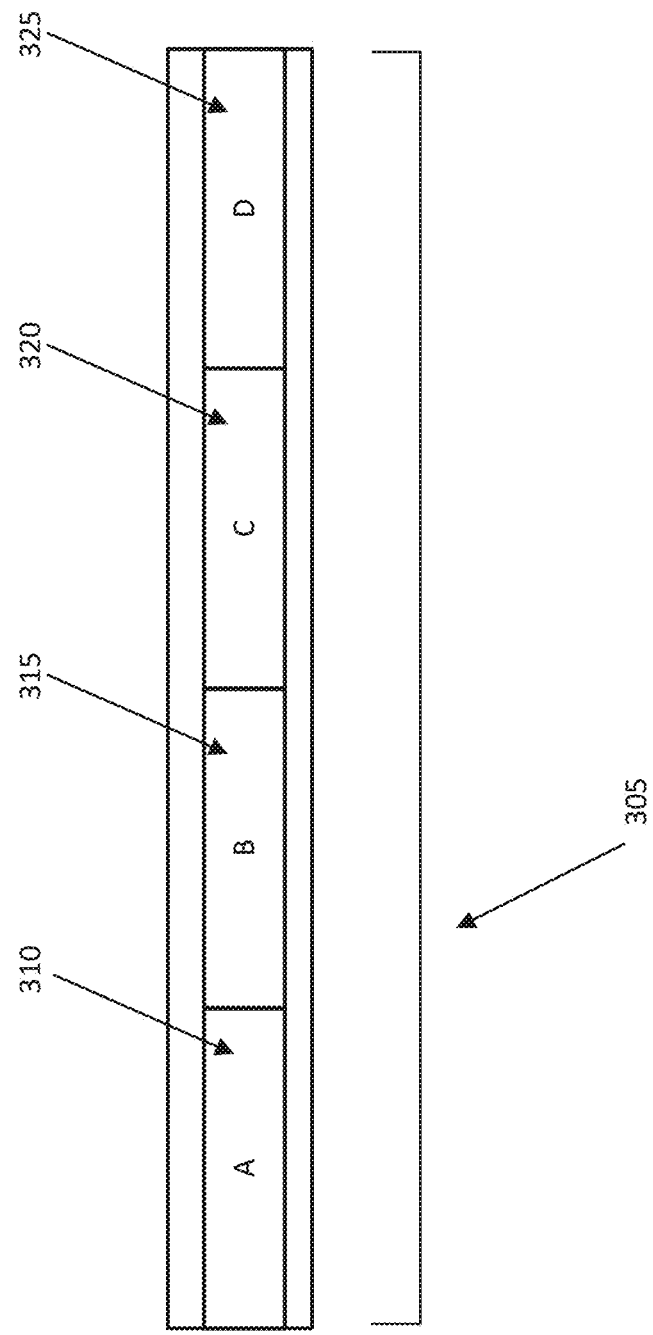
FIG. 3 may be an illustration of blocks of data being used to train a machine learning system.

In other embodiments, machine learning may be used to determine the best database for each query. The machine learning may examine past queries and past results and determine which database may be considered the best database for each search. Machine learning may be used to analyze past results in view of the actual results, so that the determination of a proper database becomes more accurate. Machine learning may be used to review a training group of past results and determine improved results moving forward. FIG. 3 may illustrate sample artificial intelligence (AI) training data according to one or more embodiments. As an example and not a limitation, an artificial intelligence system may trained by analyzing a set of training data 305. The training data may be broken into sets, such as set A 310, set B 315, set C 320 and set D 325. As illustrated in FIG. 4A, one set may be used as a testing data set (e.g., set D 325) and the remaining sets may be used as a training data set (e.g., set A 310, set B 315 and set C 320), The artificial intelligence system may analyze the training data set (e.g., set A 310, set B 315 and set C 320) and use the testing set (e.g., set D 325) to test the model created from the training data. The data sets may shift as illustrated in FIG. 4B, where the testing data set may be added to the training data sets (e.g., set A 310, set B 315 and set D 325) and one of the training data sets that has not been used to test before (e.g., set C 320) may be used as the testing data set. The analysis of the new training data (e.g., set A 310, set B 315 and set D 325) may occur again with the new testing set (e.g., set C 320) being used to test the model and the model may be refined. The rotation of data sets may occur repeatedly until all the datasets have been used as the test data set. The model then may be considered complete and the model may then be used on additional data sets.

While machine learning may help establish an improved coverage pattern, observing the signal strength in the primary mobile receiving vehicle 110 and in the mobile receiving vehicles 141-146. More specifically, moving the mobile receiving vehicles 141-146 may result in signal strength improving or declining for the portable computing devices 130. By adjusting the location of the mobile receiving vehicles 141-146 and primary mobile receiving vehicle 110, a maximum signal strength across the various portable computing devices 130 that are connected to the network. In some embodiments, the mobile receiving vehicle 141-146 may also have directional antennas. The direction of the antennas may also be a factor to be considered in creating the improved coverage pattern.

At block 250, the mobile receiving stations may be instructed to move according to the improved coverage design. As mentioned previously, moving the mobile receiving vehicles 141-146 may result in signal strength improving or declining for the portable computing devices 130. By adjusting the location of the mobile receiving vehicles 141-146 and primary mobile receiving vehicle 110, a maximum signal strength across the various portable computing devices 130 that are connected to the network.

Logically, the network may include a processor physically configured according to computer executable instructions, a memory physically configured to store computer executable instructions and an input output circuit in communication with a high speed data link. The hardware may be physically configured to optimize the network. For example, if the mobile receiving vehicle 141-146 may be a drone, the processor may be physically configured to turn of unneeded sections of a processor to save battery power. Further, processors may contain transistors which indicate the ones and zeros of machine language instructions. The relevant computer executable instructions may causes the transistors to physically change to execute a process. Similarly, memory storage requires the physical transformation of circuits to store data as 1 or 0s (on or off). The memory also may be modified for the situation as high speed may be needed to make quick decisions regarding vehicle travel paths.

In another aspect, a power level of each mobile receiving station 141-146 may be determined. As mentioned previously, the mobile receiving vehicle 141-146 may be drones, plane or land based vehicles that may operate on portable power sources. Portable power sources may drain over time to the point that the mobile receiving vehicle 141-146 may fail to operate. The mobile receiving station replacement plan may be determined. In some embodiments, the vehicles may return to the communication agent 120 to be recharged while other vehicles may be launched or adjusted to cover an area while the drained vehicle may be recharged.

The mobile receiving station replacement plan may be based on several factors. In one embodiment, some factors may include the demand on each receiving station, the time to replace the mobile receiving station and the remaining power in the mobile receiving station. In some embodiments, a replacement mobile receiving vehicle 141-146 may be sent in advance of the mobile receiving vehicle 141-146 running out of power. In other embodiments, an exchange of a replacement and return of a mobile receiving vehicle 141-146 may be simultaneous. In yet another embodiment, the system may rearrange the location of the mobile receiving vehicle 141-146 while one or more mobile receiving vehicle 141-146 is refueled.

In some embodiments, weather may have an effect on battery life and the placement of the mobile receiving vehicle 141-146. On a windy day, it may take more power to keep the mobile receiving vehicle 141-146 in place and the replacement plan may have to be modified. Similarly, on a rainy day, the mobile receiving vehicle 141-146 may be heavier and the replacement plan may have to be adjusted.

In some situations, more mobile receiving vehicle 141-146 may be needed as some mobile computing devices 130 may have inadequate coverage. In other embodiments, less mobile receiving vehicle 141-146 may be needed as coverage may be sufficient with fewer mobile receiving vehicle 141-146.

In some additional situations, more or less mobile communication devices 130 may move in and out of the relevant area. Logically, the system and method may take into account the varying demands on the system and may adjust the coverage plan as needed. For example, is a concert at one end of a state fair end, people may leave and less mobile receiving vehicle 141-146 may be needed. Similarly, a new concert may start at a different end of a state fair and more mobile receiving vehicle 141-146 may be needed over the new concert area. The number of requests for service may be logged and used as an input in determining the coverage design.

Once the plan is created, the improved coverage design based on the mobile receiving station replacement plan may be implemented. The various mobile receiving vehicle 141-146 may be instructed to move to determined positions at the determined times according to the mobile receiving station replacement plan.

Figure 5:
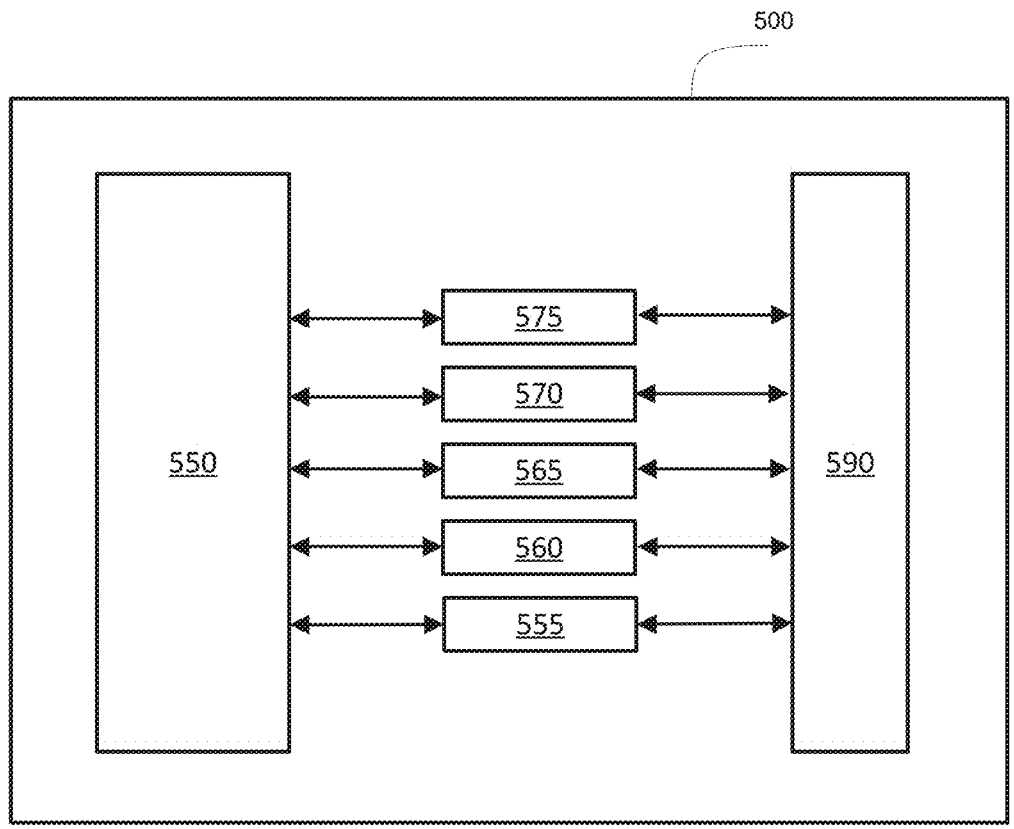
FIG. 5 may be an illustration of the computing elements used by the system.

FIG. 5 may be an example electronic device 500 that is part of the system that may be used to execute the blocks of the method described in relation to FIG. 2. The electronic device 500 may be physically configured to interact or communicate with other electronic devices via a communication network, such as a Wi-Fi network or a cellular network, for example, cellular network. The electronic device 500 may have a processor 550 that is physically configured according to computer executable instructions as the logic gate may be physically altered according to the computer executable instructions. The electronic device 500 may have a power supply 555 such as a battery, which may be rechargeable. The electronic device 500 may also have a sound and video module 560 which assists in displaying video and sound and may turn off when not in use to conserve power and battery life. The electronic device 500 may also have volatile memory 565 and non-volatile memory 70 as well as internal storage 575 or external storage. The electronic device 500 may have an input/output bus 590 that shuttles data to and from various user input devices such as a keyboard, mouse, speakers, or other inputs. It also may control communicating with other electronic devices and system components, either through wireless or wired devices. Of course, this is just one embodiment of the electronic device 500 and the number and types of electronic devices 500 is limited only by the imagination.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

The electronic devices, computing devices, sensors, computers, routers, and/or servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse; a keyboard, or a microphone; and a video display system. The user computing devices, computers, and servers described herein may be running on any one of many operating systems including; but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The electronic devices, computers, sensors, routers, and servers described herein may communicate via communications networks, including the Internet, WAN, LAN, Wi-Fi, cellular, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C+, C++, Python, Perl, or Assemble using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

The invention claimed is:

1. A portable cellular communication network comprising:
   a primary mobile receiving vehicle in high speed communication with a communication agent, the primary mobile receiving vehicle comprising:
      a primary mobility enablement device;
      a secure primary mobile communication device;
      a high speed communication link to the communication agent; and
      a power link to a power supply; and
   a plurality of mobile receiving vehicles in communication with the primary mobile receiving vehicle, wherein each of the plurality of mobile receiving vehicles further comprises:
      a mobility enablement device configured to move the respective each of the plurality of mobile receiving vehicles;
      a secure communication device; and
      a portable power source;
   wherein the communication agent comprises a processor that is physically configured by computer executable instructions to:
      determining a mobile receiving vehicle replacement plan based on a power level of the plurality of mobile receiving vehicles and a time to replace the plurality of mobile receiving vehicles;
      creating an improved coverage design based on the mobile receiving vehicle replacement plan; and
      instructing the plurality of mobile receiving vehicles to move according to the improved coverage design.

2. The portable cellular communication network of claim 1, wherein the communication agent further comprises:
   a memory physically configured to store computer executable instructions; and
   an input output circuit in communication with a high speed data link.

3. The portable cellular communication network of claim 1, wherein the processor is further physically configured by computer executable instructions to:
   measure the demand on each of the mobile receiving vehicles based on a current coverage design;
   determine the improved coverage design based on the demand of each of the mobile receiving vehicles; and
   instructing the mobile receiving vehicles to move according to the improved coverage design.

4. The portable cellular communication network of claim 1, wherein the processor is physically configured by computer executable instructions to:
   determine whether more or less mobile receiving vehicles are needed;
   create the improved coverage design including more or less mobile receiving vehicles; and
   instruct the mobile receiving vehicles to move according to the improved coverage design.

5. The portable cellular communication network of claim 1, wherein the processor is physically configured by computer executable instructions to
   determine the mobile receiving vehicle replacement plan based on
      the demand on each of the plurality of mobile receiving vehicles.

6. The portable cellular communication network of claim 1, wherein a high speed communication link to the communication agent comprises a fiber link.

7. The portable cellular communication network of claim 6, wherein the communication link further comprises a power link to a power supply.

8. A method of providing a cellular communication network over an area comprising:
   launching a primary mobile receiving vehicle in high speed communication with a communication agent, the primary mobile receiving vehicle comprising:
      a primary mobility enablement device;
      a secure primary mobile communication device;
      a high speed communication link to the communication agent; and
      a power link to a power supply; and
   launching a plurality of mobile receiving vehicles in communication with the primary mobile receiving vehicle, wherein each of the plurality of mobile receiving vehicles further comprises:
      a mobility enablement device;
      a secure communication device; and
      a portable power source;
   measuring a demand on each of the plurality of mobile receiving vehicles based on a current coverage design;
   determining a mobile receiving vehicle replacement plan based on a power level of the plurality of mobile receiving vehicles, a time to replace the plurality of mobile receiving vehicles, and the demand on each of the plurality of mobile receiving vehicles;
   determining an improved coverage design based on the mobile receiving vehicle replacement plan; and
   instructing the plurality of mobile receiving vehicles to move according to the improved coverage design.

9. The method of claim 8, wherein the communication agent comprises:
   a processor physically configured according to computer executable instructions;
   a memory physically configured to store computer executable instructions; and an input output circuit in communication with a high speed data link.

10. A tangible, non-transitory computer readable medium comprising computer executable instructions for:
launching a primary mobile receiving vehicle in high speed communication with a communication agent, the primary mobile receiving vehicle comprising:
   a primary mobility enablement device;
   a secure primary mobile communication device;
   a high speed communication link to the communication agent; and
   a power link to a power supply; and
launching a plurality of mobile receiving vehicles in communication with the primary mobile receiving vehicle, wherein each of the plurality of mobile receiving vehicles further comprises:
   a mobility enablement device;
   a secure communication device; and
   a portable power source;
measuring a demand on each of the plurality of mobile receiving vehicles based on a current coverage design;
determining a mobile receiving vehicle replacement plan based on a power level of the plurality of mobile receiving vehicles, a time to replace the plurality of mobile receiving vehicles, and the demand on each of the plurality of mobile receiving vehicles;
determining an improved coverage design based on the mobile receiving vehicle replacement plan; and
instructing the plurality of mobile receiving vehicles to move according to the improved coverage design.

11. The computer readable medium of claim 10, wherein the communication agent comprises:
   a processor physically configured according to computer executable instructions;
   a memory physically configured to store computer executable instructions; and
   an input output circuit in communication with a high speed data link.

\* \* \* \* \*